E. A. PHINNEY.
PIN AND JOINT.
APPLICATION FILED DEC. 26, 1908.

966,763.

Patented Aug. 9, 1910.

WITNESSES:
C. T. Hannigan.
Lottie V. Martin.

INVENTOR:
Elisha A. Phinney
By James L. Jenks
Attorney.

UNITED STATES PATENT OFFICE.

ELISHA A. PHINNEY, OF PAWTUCKET, RHODE ISLAND, ASSIGNOR TO GEORGE H. FULLER & SON COMPANY, OF PAWTUCKET, RHODE ISLAND, A CORPORATION OF RHODE ISLAND.

PIN AND JOINT.

966,763.  Specification of Letters Patent.  Patented Aug. 9, 1910.

Application filed December 26, 1908. Serial No. 469,497.

*To all whom it may concern:*

Be it known that I, ELISHA A. PHINNEY, a citizen of the United States, residing at Pawtucket, in the county of Providence and State of Rhode Island, have invented certain new and useful Improvements in Pins and Joints, of which the following is a specification.

My invention relates to improvements in pins and pin joints and the object of my invention is to provide a pin having a pivot and a stop integral with the pin itself, in combination with a joint provided with suitable lugs for the engagement of said stop so as to limit the movement of said pin in both directions. I accomplish these objects in the manner shown in the accompanying drawings in which the various parts are indicated by the same letters throughout.

Figure 1:
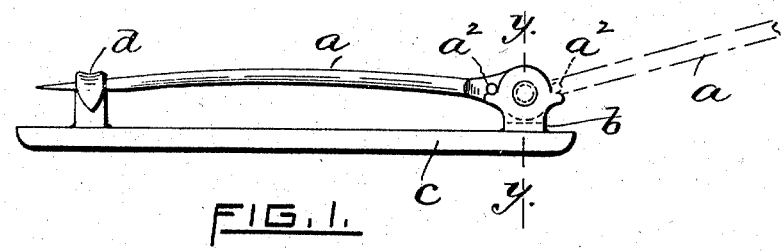
Figure 2:
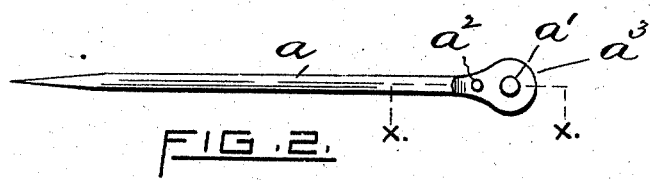
Figure 3:
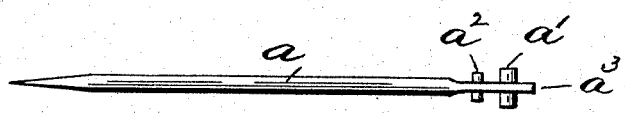
Figure 4:
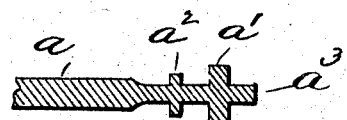
Figure 5:
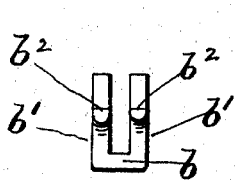
Figure 6:
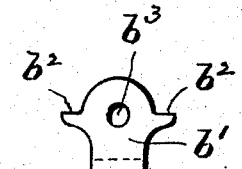
Figure 7:
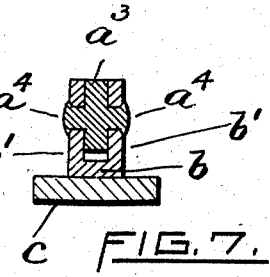

Figure 1 constitutes an elevation of the brooch showing my pin and joint; Fig. 2 a side view of the pin; Fig. 3 a top view of the same; Fig. 4 a sectional view of the pin showing the pivot and stop on the line $x$—$x$ of Fig. 2; Figs. 5 and 6 are respectively end and side views of my joint; and Fig. 7 a vertical section of the brooch, pin and joint on the line $y$—$y$ of Fig. 1.

In Fig. 1, $c$ is the body of the brooch, $a$ the pin, $d$ the catch, $b$ the pin joint or bearing and $a^2$ the stop which is integral with the pin itself.

In Fig. 2, $a'$ represents the pivot, and $a^3$ the flattened head of the pin carrying the pivot $a'$ and the stop $a^2$. A vertical view of these parts is given in Fig. 3 and a sectional view in Fig. 4.

In Fig. 5, $b$ represents the base or body of the joint or bearing having the side or check pieces $b'$—$b'$ projecting therefrom in the usual form, and which side pieces have integral therewith the lugs $b^2$—$b^2$; these lugs are best seen in Fig. 6, which also shows the perforation $b^3$ for the insertion of the pivot $a'$ of the pin $a$.

The pivot $a'$ and stop $a^2$ are struck by the dies in the same operation that flattens the head $a^3$ of the pin $a$, both the stop and pivot being integral and of the same piece with the flattened head itself, and projecting from both faces thereof at right angles as shown. The extremities of the pivot $a'$ may if desired project a little beyond the outside faces of the joint, so that the pivots can be riveted after insertion in the joint or any other suitable means may be employed therefor. It is an important feature of my invention that the movement or throw of the pin in the joint is limited not alone in one direction but in both directions by the stop $a^2$ of the pin engaging the projecting lugs $b^2$ $b^2$ of the joint or pin bearing $b$—$b'$. The lugs $b^2$ on one side of the bearing are in the same plane as those at the opposite side, and as lugs are provided on opposite sides of each cheek-piece, the stop $a^2$ engages with two lugs in each extreme position of the pin.

The joint is attached to the brooch by soldering or any other suitable method.

I am aware that prior to my invention pins have been made having pivots integral with the pin itself. I am also aware that a pin having a stop integral with such pin and limiting the movement of the pin in a single direction has been produced; but I am not aware that any pin exists embodying a pivot and a stop both integral with the pin itself and operating with a suitable joint so as to limit the movement of said pin in both directions.

What I claim and desire to secure by Letters Patent is—

In an improved pin and joint, a pin having its shank flattened at one end to constitute a head, said head comprising a flaring portion terminating in a circular portion, the said flaring portion terminating in the shank, a pair of lateral lugs formed integral with said circular portion centrally thereof, said lugs extending in opposite directions with respect to each other and furthermore extending in the same plane and constituting a pivot, a pair of lugs formed integral with said flaring portion in proximity to said circular portion, extending in opposite directions with respect to each other and further extending in the same plane and constituting a pair of stops, a bearing embodying a pair of spaced apertured cheek-pieces in which the lugs constituting the pivot are mounted, each of said cheek-pieces provided with laterally projecting lugs, the adjacent lugs on the cheek pieces extending in the same plane with respect to each other and further extending at right angles with respect to a stop and the pivot, said stops adapted to engage the lugs of the cheek-pieces for limiting the pivoting movement of the pin in either direction.

In testimony whereof I affix my signature in presence of two witnesses.

ELISHA A. PHINNEY.

Witnesses:
ROSCOE M. DEXTER,
LOTTIE V. MARTIN.